US012777317B2

(12) United States Patent
Edar et al.

(10) Patent No.: US 12,777,317 B2
(45) Date of Patent: Oct. 27, 2026

(54) SYSTEM AND METHOD FOR PERFORMING A CHANNEL SCAN

(71) Applicant: ZEBRA TECHNOLOGIES CORPORATION, Lincolnshire, IL (US)

(72) Inventors: Mahesh Kumar Edar, Davenagere (IN); Venkata Aneel Kumar Inuganti, Bangalore (IN); Darpan Majumder, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 313 days.

(21) Appl. No.: 18/513,112

(22) Filed: Nov. 17, 2023

(65) Prior Publication Data

US 2025/0168614 A1 May 22, 2025

(51) Int. Cl.
*H04W 8/00* (2009.01)
*H04W 40/24* (2009.01)

(52) U.S. Cl.
CPC ......... *H04W 8/005* (2013.01); *H04W 40/244* (2013.01); *H04W 40/248* (2013.01)

(58) Field of Classification Search
None
See application file for complete search history.

(56) References Cited

U.S. PATENT DOCUMENTS

2018/0103471 A1* 4/2018 Kharia .................. H04W 8/005
2019/0053133 A1* 2/2019 Abouelseoud ...... H04W 40/244
2023/0199587 A1* 6/2023 Edar ............ H04W 36/008357 455/352
2023/0319691 A1* 10/2023 Homchaudhuri ..... H04W 8/005 370/328

* cited by examiner

*Primary Examiner* — Srinivasa R Reddivalam

(57) ABSTRACT

A mobile computing device comprising: a wireless communications interface; a controller configured to: detect a scan condition to scan a foreign channel while connected to a home base station; implement a scanning sequence including: (a) a plurality of portions of a predefined scan interval for scanning the foreign channel, and (b) an intermediate home channel dwell period scheduled between each of the plurality of portions of the predefined scan interval; and during each intermediate home channel dwell period, return to the home base station to receive data packets buffered during a preceding portion of the predefined scan interval.

15 Claims, 6 Drawing Sheets

SYSTEM AND METHOD FOR PERFORMING A CHANNEL SCAN

BACKGROUND

Wireless networks may be serviced by several access points to which mobile devices can connect based on their location within the wireless network. As users of mobile devices move around, the mobile devices may roam to different access points. When connecting to an access point or roaming between access points, the device may perform a scan to identify potential access points by performing channel scans to detect access points operating on a given channel. However, such channel scans require the device to move away from the home access point channel for the duration of the scan, which may cause packets to be dropped from ongoing communications.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
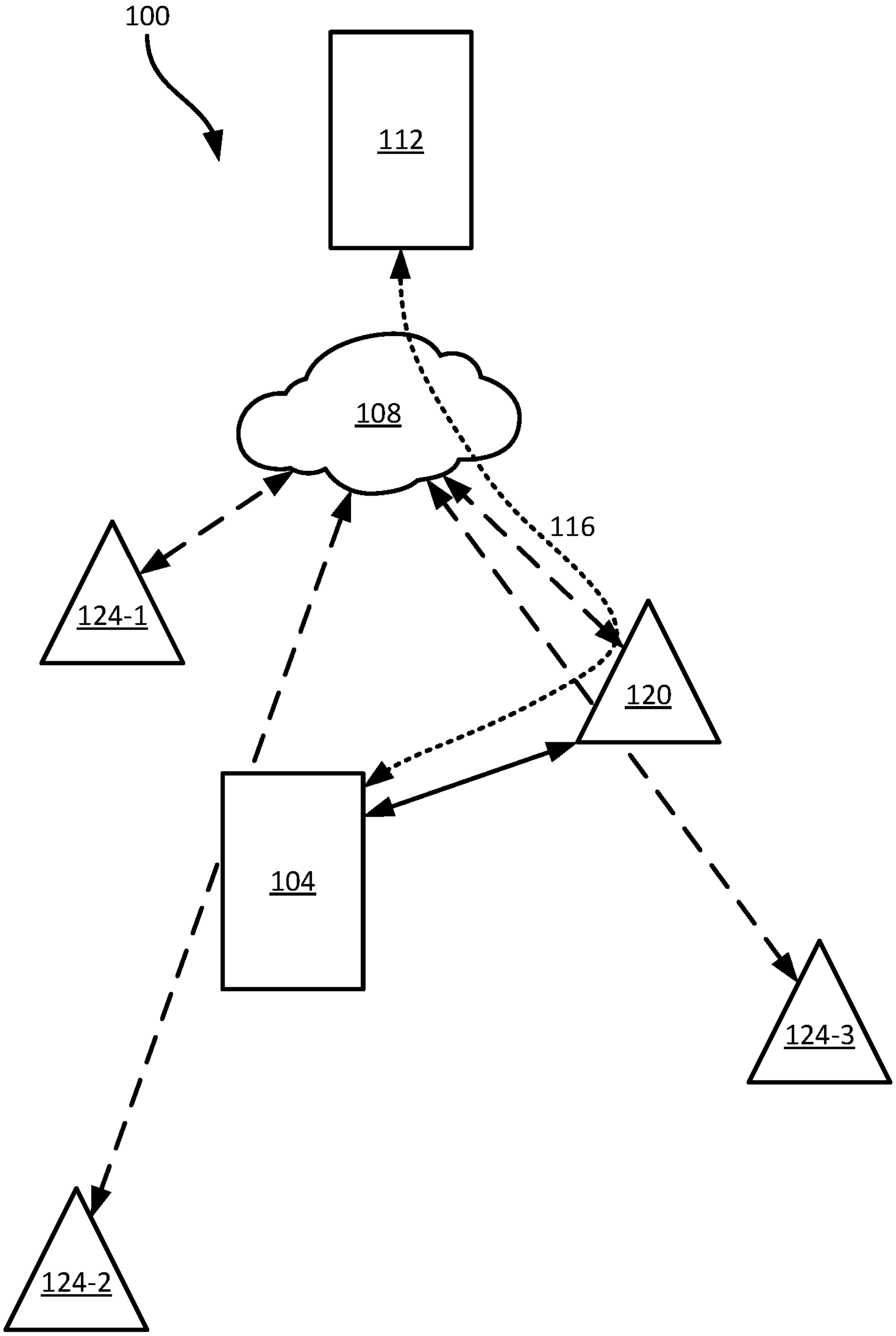
FIG. 1 is a schematic diagram of an example system for performing a channel scan.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a mobile computing device comprising: a wireless communications interface configured to connect to a network deployed by a plurality of base stations: a controller for the wireless communications interface, the controller configured to: detect a scan condition to scan a foreign channel while connected to a home base station on a home channel: implement a scanning sequence including: (a) a plurality of portions of a predefined scan interval for scanning the foreign channel, and (b) an intermediate home channel dwell period scheduled between each of the plurality of portions of the predefined scan interval; and during each intermediate home channel dwell period, return to the home channel to receive data packets buffered at the home base station during a preceding portion of the predefined scan interval.

Additional examples disclosed herein are directed to a method comprising: detecting a scan condition to scan a foreign channel while connected to a home base station on a home channel: implementing a scanning sequence including: (a) a plurality of portions of a predefined scan interval for scanning the foreign channel, and (b) an intermediate home channel dwell period scheduled between each of the plurality of portions of the predefined scan interval; and during each intermediate home channel dwell period, returning to the home channel to receive data packets buffered at the home base station during a preceding portion of the predefined scan interval.

Additional examples disclosed herein are directed to a non-transitory machine-readable medium storing instructions which when executed, configure a controller of device to: detect a scan condition to scan a foreign channel while connected to a home base station on a home channel: implement a scanning sequence including: (a) a plurality of portions of a predefined scan interval for scanning the foreign channel, and (b) an intermediate home channel dwell period scheduled between each of the plurality of portions of the predefined scan interval; and during each intermediate home channel dwell period, return to the home channel to receive data packets buffered at the home base station during a preceding portion of the predefined scan interval.

FIG. 1 depicts a system 100 for performing a channel scan with reduced jitter in accordance with the teachings of this disclosure. The system 100 includes a computing device 104 (also referred to herein as simply the device 104) connected to a network 108. The device 104 may communicate with a second computing device 112 (also referred to herein as the peer device 112) via a link 116 which traverses the network 108. In some examples, the device 112 may be remote from the device 104 and the link 116 may therefore additionally traverse one or more wide-area networks such as the Internet, mobile networks and the like.

The device 104 may be a mobile computing device such as a handheld computer, a mobile phone, a tablet, a barcode scanner or the like. As noted above, the device 104 is connected to the network 108, which may be deployed for wireless communications within a facility, such as a transportations and logistics facility, a warehouse, retail establishment, or other facility. Accordingly, the network 108 may be a wireless local area network (WLAN) deployed by one or more base stations, including without limitation one or more access points, or the like. In the present example, four access points, a home access point 120, and three foreign access points 124-1, 124-2, and 124-3 are depicted. In other examples, the network 108 may include more or fewer access points.

In particular, the device 104 may be currently serviced by the home access point 120 to connect to the network 108. Since the device 104 may be mobile, the device 104 may be carried about by a user. As the user of the device 104 moves about the facility or other region serviced by the network 108, the connection of the device 104 to the home access point 120 may weaken, and the device 104 may be better serviced by another foreign access point 124 of the network 108. Accordingly, the device 104 may scan the foreign access points 124 and may subsequently roam to one of the foreign access points 124 to connect to the network 108, for example when the device 104 is out of range of the home access point 120 and/or when a better connection may be achieved via one of the foreign access points 124.

To roam to a foreign access point 124 from the home access point 120, the device 104 may periodically scan for foreign access points 124 to which the device 104 may connect. While the device 104 scans for foreign access points 124, the device 104 may temporarily disconnect from the home access point 120, and hence any communications and data transmissions to and from the device 104 may be temporarily disrupted. Accordingly, to maintain data transmissions, the home access point 120 may buffer data packets to be sent to the device 104. Upon completion of the scan, the device 104 returns to the home access point 120 for an amount of time, known as a home channel dwell time. The home channel dwell time may have a predefined default duration. During the home channel dwell time, the device 104 receives the buffered data packets and any new incoming data packets received.

A scan interval for a given channel as used herein is an interval of time to remain on a foreign channel to be sufficient to identify the foreign access point. Accordingly, each the mobile device 104 may be configured to perform a channel scan having a scan duration spanning at least the scan interval. For example, if a typical scan requires about 100 ms to identify the foreign access point, the scan interval may be 100 ms. Accordingly, the device 104 may perform a channel scan having a scan duration of at least the scan interval. For example, the device 104 may have a default scan duration of 110 ms which exceeds the scan interval to ensure that an entire 100 ms scan interval is achieved during the scan, for example including some time to switch between channels at the beginning of the scan. In other examples, longer or shorter scan intervals and corresponding scan durations may be applicable.

In particular, dynamic frequency selection (DFS) channels are configured to emit periodic beacon signals at a predefined beacon interval. Accordingly, the scan interval may be equal to the predefined beacon interval to ensure that a beacon signal is received within the scan interval. For example, if the DFS channel is configured to emit a beacon signal every 103 ms, then the beacon interval and the scan interval are also equal to 103 ms, such that the beacon signal is emitted at the same relative point in any given iteration of the scan interval. The default scan duration for a DFS channel scan may therefore similarly be 110 ms.

While the device 104 is away from the home access point 120 for the scan duration, the home access point 120 buffers data packets, and may transmit the data packets to the device 104 when the device 104 returns to the home access point 120 during the home channel dwell time. Longer scan durations may result in increased dropped packets and lower quality of voice calls or the like.

Thus, in accordance with the present specification, the scan interval may be divided into a plurality of portions and the scan duration may be divided into at least two scan periods, each of which is configured to span a respective subset of the portions, such that each portion is spanned by at least one of the scan periods. The scan periods may be scheduled in a scanning sequence or scanning schedule which may span multiple iterations of the scan interval. The scanning sequence thus include the plurality of portions of the predefined scan interval, and the plurality of portions (or the scan periods), in aggregate span the predefined scan interval. Accordingly, for a DFS channel scan, for example, the scanning schedule ensures that a beacon signal will be received during one of the scan periods, since the beacon signal is emitted at the same relative point (and hence in the same portion) in any given iteration of the scan interval and each of the portions of the scan interval is spanned by at least one of the scan periods.

The scan periods may be scheduled with an intermediate home channel dwell period between each consecutive pair of scan periods. The default scan duration may therefore be sub-divided into a plurality of shorter scan periods, and the device 104 may return to the home access point 120 to receive buffered data packets during each intermediate home channel dwell period. Accordingly, this scanning schedule may reduce the amount of consecutive time spent away from the home access point 120 by the device 104 to the scan period, thereby reducing the likelihood of dropped data packets.

Figure 2:
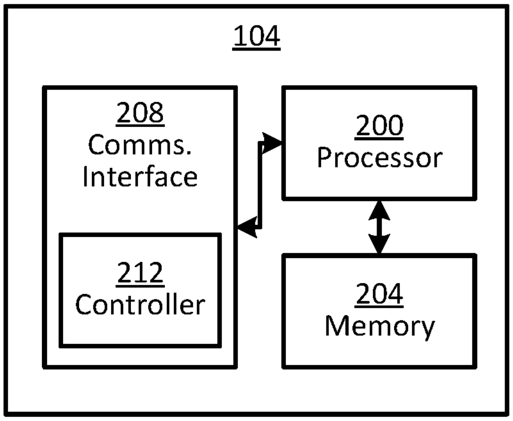
FIG. 2 is a block diagram of certain internal hardware components of the detection device of FIG. 1.

Turning now to FIG. 2, certain internal components of the computing device 104 are illustrated. The device 104 includes a processor 200 interconnected with a non-transitory computer-readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 may each comprise one or more integrated circuits. The memory 204 stores computer-readable instructions for execution by the processor 200, including one or more applications which, when executed, configure the processor 200 to perform the various functions of the device 104.

The device 104 further includes a communications interface 208 enabling the device 104 to exchange data with other computing devices, such as the device 112. The communications interface 208 is interconnected with the processor 200. The communications interface 208 includes a controller 212, and one or more antennas, transmitters, receivers, or the like (not shown), to allow the device 104 to communicate with other computing devices such as the device 112 via the link 116.

The controller 212 may be a micro-controller, a microprocessor, or other suitable device capable of executing computer-readable instructions to control the components, such as the antennae, transmitters, receivers, and the like, of the communications interface 208 to perform the functionality described herein. The controller 212 may comprise one or more integrated circuits and may include and/or be interconnected with a non-transitory computer-readable storage medium storing computer-readable instructions which when executed configure the controller 212 and/or the communications interface 208 to perform the functionality described herein. In particular, the controller 212 may control a scanning operation.

The device 104 may further include one or more input and/or output devices (not shown) suitable to allow an operator to interact with the device 104. The input devices may include one or more buttons, keypads, touch-sensitive display screens or the like for receiving input from an operator. The output devices may further include one or more display screens, sound generators, vibrators, or the like for providing output or feedback to an operator.

Figure 3:
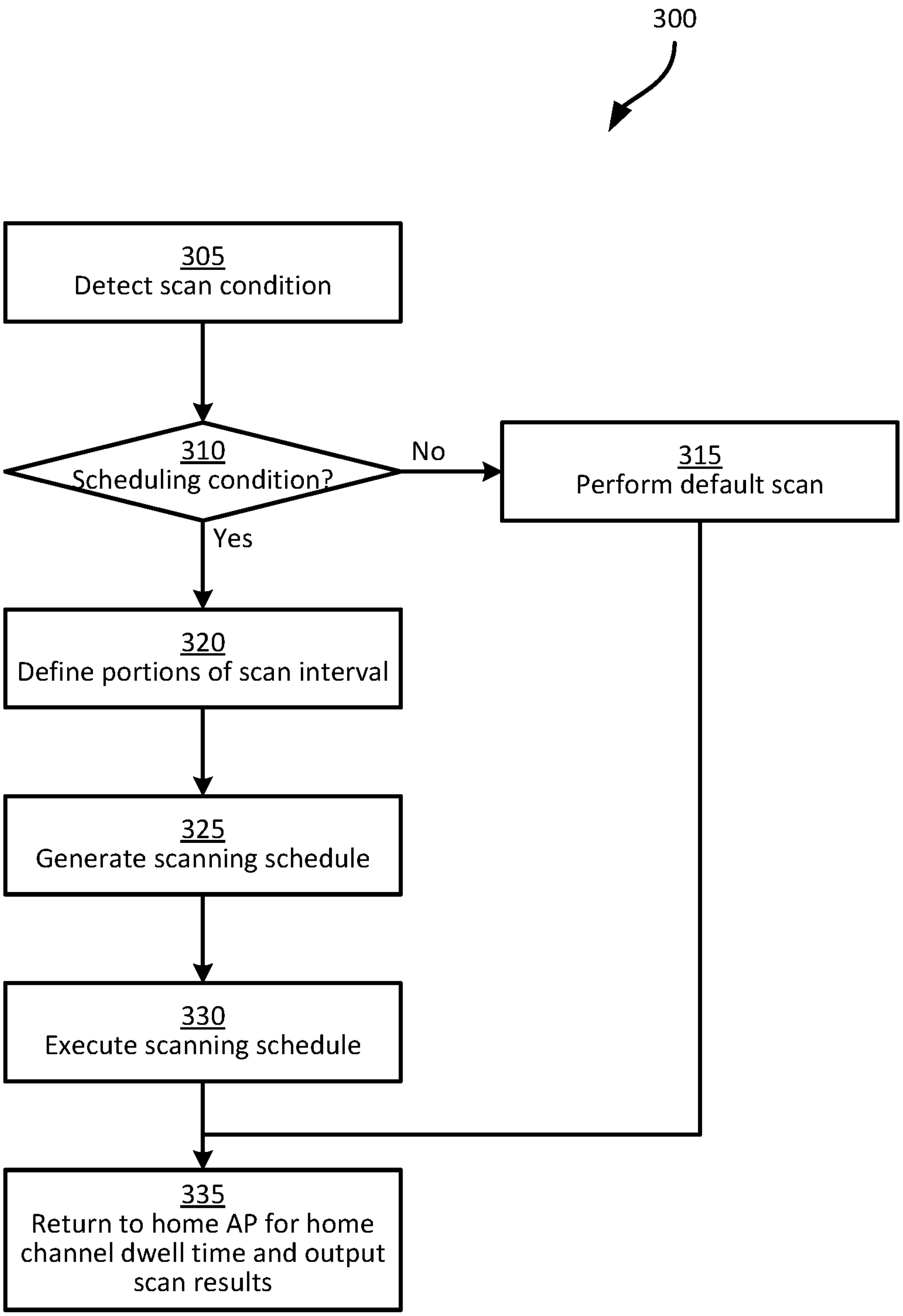
FIG. 3 is a flowchart of an example method of performing a channel scan.

FIG. 3 illustrates a method 300 of performing a channel scan with reduced jitter. The method 300 will be discussed in conjunction with its performance in the system 100, and particularly by the device 104. In particular, the method 300 will be described with reference to the components of FIGS.

1 and 2. In other examples, the method 300 may be performed by other suitable devices and/or in other suitable systems.

The method 300 is initiated at block 305, where the device 104 detects a scan condition to scan a foreign channel while the device 104 is connected to a home base station (e.g., home access point 120) on a home channel. For example, the device 104 may detect that a signal strength to the home access point 120 is below a threshold strength, that a quality of service (e.g., as determined based on jitter, latency, etc.) is below a predetermined threshold, or other similar condition. As a result, the device 104 may initiate a scan for foreign access points 124. To perform the scan, the device 104 may select a foreign channel corresponding to a particular foreign access point 124 to scan. In particular, the selection of the foreign channel may trigger the scan condition at block 305.

At block 310, the device 104 determines whether a scheduling condition is met. For example, the device 104 may make the determination at block 310 based on the type of the foreign channel to be scanned. For example, if the foreign channel is a DFS channel, or another channel type requiring a passive scan to be performed, the device 104 may make an affirmative determination at block 310. In other examples, the device 104 may make the determination at block 310 based on the default scan duration for the foreign channel. If the default scan duration is above a predefined threshold duration, the device 104 may similarly make an affirmative determination at block 310. In other examples, other suitable scheduling conditions are also contemplated.

If the determination at block 310 is negative, that is, the device 104 determines that the scanning condition is not met, then the device 104 proceeds to block 315. At block 315, the device 104 is configured to scan according to a default scanning method, for example by passively or actively scanning the foreign channel for the predefined default scan duration.

If the determination at block 310 is affirmative, that is, the device 104 determines that the scanning condition is met, then the device 104 proceeds to block 320. At block 320, the device 104 defines a plurality of portions of a predefined scan interval for scanning the foreign channel. For example, the predefined scan interval may be a beacon interval at which beacon signals are configured to be emitted on the foreign channel. The predefined scan interval may be a default value stored in the memory of the device 104, for example based on the type of the foreign channel being scanned.

The device 104 may then define a plurality of portions of the scan interval. For example, the device 104 may simply effectively divide the scan interval in half to define a first-half portion and a second-half portion. In other examples, the device 104 may divide the scan interval into more than two portions, or the device 104 may divide the scan interval into two or more unequal portions. In some examples, the device 104 may define the plurality of portions in conjunction with or after generating the scanning schedule at block 325 described below.

At block 325, the device 104 is configured to generate a scanning schedule for scanning the foreign channel. The scanning schedule generated by the device 104 includes at least two scan periods. Each scan period of the scanning schedule is configured to span a respective subset of the portions of the scan interval. Preferably, the scan periods and the portions of the scan interval may have a one-to-one correspondence, such that each scan period spans a respective portion of the scan interval. Further, the scanning schedule includes an intermediate home channel dwell period arranged between each consecutive pair of the scan periods. That is, the scanning schedule interleaves scan periods and intermediate home channel dwell periods. Accordingly, the scanning schedule may include one fewer intermediate home channel dwell periods than the number of scan periods. As will be appreciated, since consecutive scan periods are spaced apart in time by an intermediate home channel dwell period, each scan period may span the respective portion of the scan interval over different iterations of the scan interval.

Figure 4:
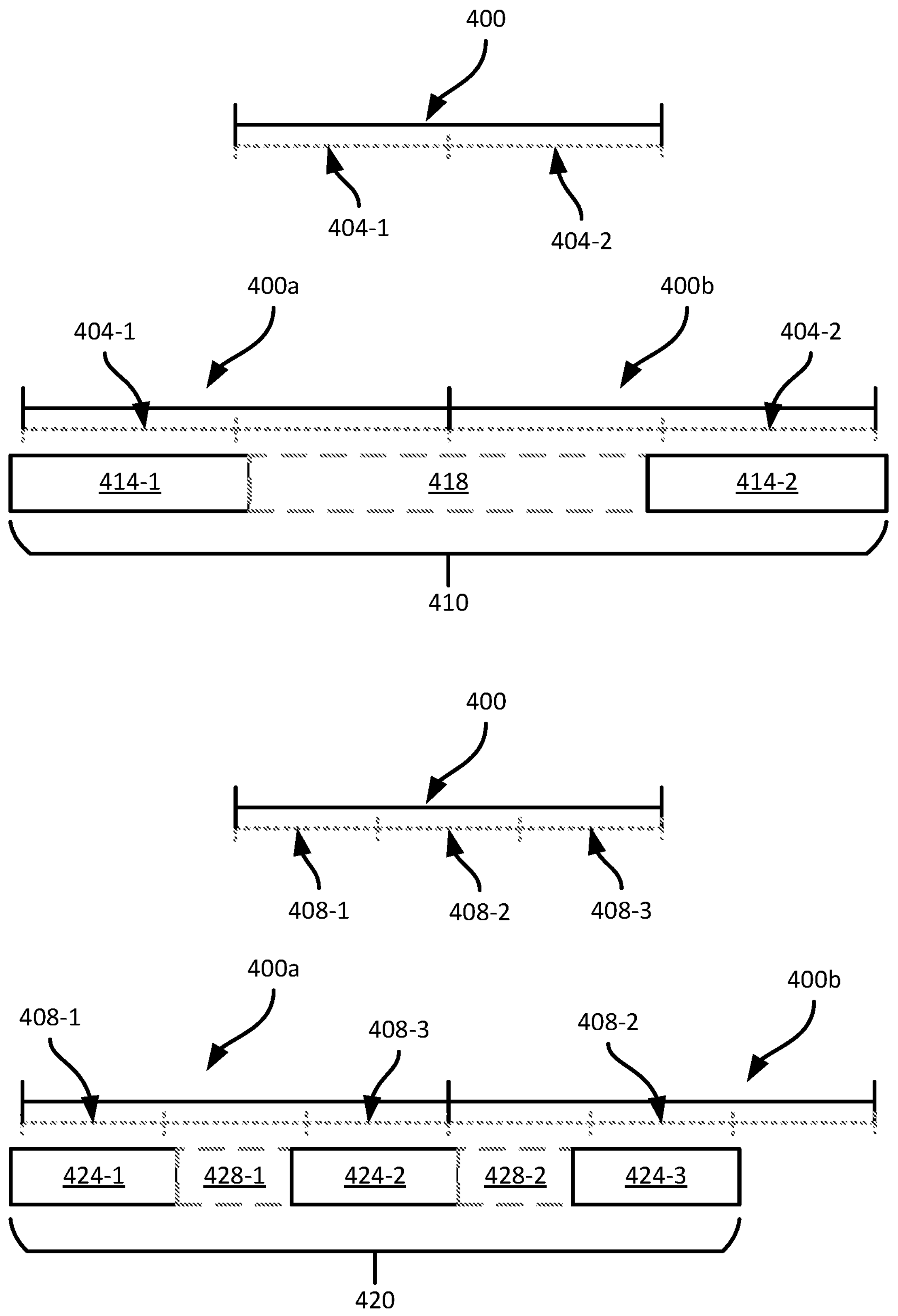
FIG. 4 is a schematic diagram of two example performances of generating a scanning schedule at block 325 of the method of FIG. 3.

For example, referring to FIG. 4, a schematic diagram of an example scan interval 400 is depicted.

According to a first example, the scan interval 400 may be divided into two portions 404-1 and 404-2, each representing about one half of the scan interval 400. The device 104 may then generate a scanning schedule 410 including two scan periods 414-1 and 414-2, and an intermediate home channel dwell period 418. The first scan period 414-1 is configured to span the first portion 404-1 of the scan interval 400, and further, may exceed the first portion 404-1, to account for time spent switching channels or the like. The second scan period 414-2 is configured to span the second portion 404-2 of the scan interval 400 and may similarly exceed the second portion 404-2. The intermediate home channel dwell period 418 is arranged between the first scan period 414-1 and the second scan period 414-2. Accordingly, the first scan period 414-1 spans the first portion 404-1 during a first iteration 400*a* of the scan interval 400, while the second scan period 414-2 spans the second portion 404-2 during a second iteration 400*b* of the scan interval 400.

According to a second example, the scan interval 400 may be divided into three portions 408-1, 408-2, 408-3. The device 104 may generate a scanning schedule 420 including three scan periods 424-1, 424-2, and 424-3, and two intermediate home channel dwell periods 428-1 and 428-2. The scanning schedule 420 may be arranged such that the first scan period 424-1 spans the first portion 408-1 during a first iteration 400*c* of the scan interval 400. The first scan period 424-1 is followed by the first intermediate home channel dwell period 428-1. The second scan period 424-2 may be configured to span the third portion 408-3 during the first iteration 400*c* of the scan interval 400. The second scan period 424-2 is followed by the second intermediate home channel dwell period 428-2. Finally, the third scan period 424-3 is configured to span the second portion 408-2 during the second iteration 400*d* of the scan interval 400. Thus, while the scan interval 400 is divided into three portions 408-1, 408-2, and 408-3, the scanning schedule 420 may be generated so as to span each of the portions 408-1, 408-2, and 408-3 of the scan interval 400 within two iterations 400*c* and 400*d* of the scan interval 400.

Returning to FIG. 3, after generating the scanning schedule at block 325, the device 104 proceeds to block 330 to execute the scanning schedule. In particular, during each scan period defined in the scanning schedule, the device 104 is configured to perform an abbreviated scan at the foreign channel. In particular, the abbreviated scan has the duration of the scan period and is shortened relative to the default channel scan having the default scan duration. In other respects, the abbreviated scan may otherwise be similar to the default scan, for example including a passive or active scan, in accordance with the standards for the type of the foreign channel.

During each intermediate home channel dwell period, the device 104 is configured to return to the home channel and the home access point 120 to receive data packets buffered at the home access point 120 during the preceding scan period. In particular, since each of the scan periods are shorter than the default scan duration, the device 104 is away from home access point 120 for less time. That is, the inter-arrival time between connections to the home access point 120 and between receipt of data packets at the device 104 is shorter. Accordingly, data packets are less likely to be dropped or lost due to the jitter buffer being exceeded or the like.

Further, on DFS channels or other channel types on which a passive scan is initially performed, the generation of the scanning schedule such that each portion of the scan interval is spanned by at least one of the scan periods ensures that the beacon signal emitted on the foreign channel is received during one of the scan periods of the scanning schedule.

Figure 5:
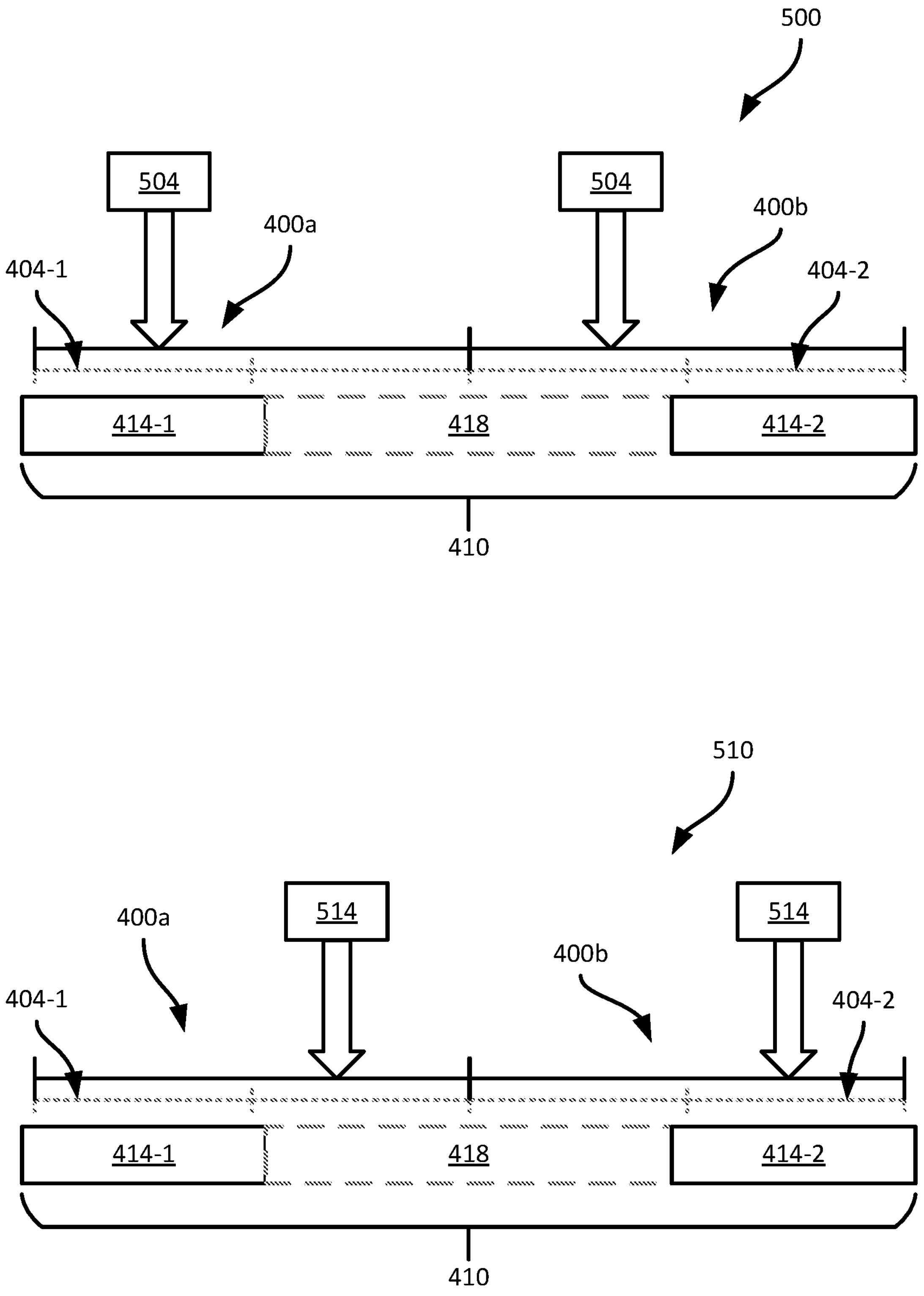
FIG. 5 is a schematic diagram of two example performances of detecting a beacon while executing a scanning schedule at block 330 of the method of FIG. 3.

For example, referring to FIG. 5, according to a first example timeline 500, a beacon signal 504 may be emitted during the first half of the scan interval 400 of FIG. 4. Since the scan interval 400 is equal to the beacon interval of the beacon signal 504, the beacon signal 504 is emitted at the same time relative to the scan interval 400 at each iteration of the scan interval 400. Thus, the beacon signal 504 is emitted within the first portion 404-1 of each iteration 400*a*, 400*b* of the scan interval 400.

Accordingly, when executing the scanning schedule 410, the device 104 receives the beacon signal 504 during the first scan period 414-1 which spans the first portion 404-1 of the scan interval 400 in the first iteration 400*a* of the scan interval 400. The device 104 may not receive the beacon signal 504 during the second scan period 414-2, since it spans the second portion 404-2 of the scan interval 400.

According to another example timeline 510, a beacon signal 514 may be emitted during the second half of the scan interval 400. Accordingly, the beacon signal 514 is emitted within the second portion 404-2 of each iteration 400*a*, 400*b* of the scan interval 400.

Accordingly, when executing the scanning schedule 410, the device 104 does not detect the beacon signal 514 during the first scan period 414-1 in the first iteration 400*a* of the scan interval 400, since the first scan period 414-1 spans the first portion 404-1 of the scan interval 400. Rather, the device 104 receives the beacon signal 514 during the second scan period 414-2 which spans the second portion 404-2 of the scan interval 400 in the second iteration 400*b* of the scan interval 400.

Figure 6:
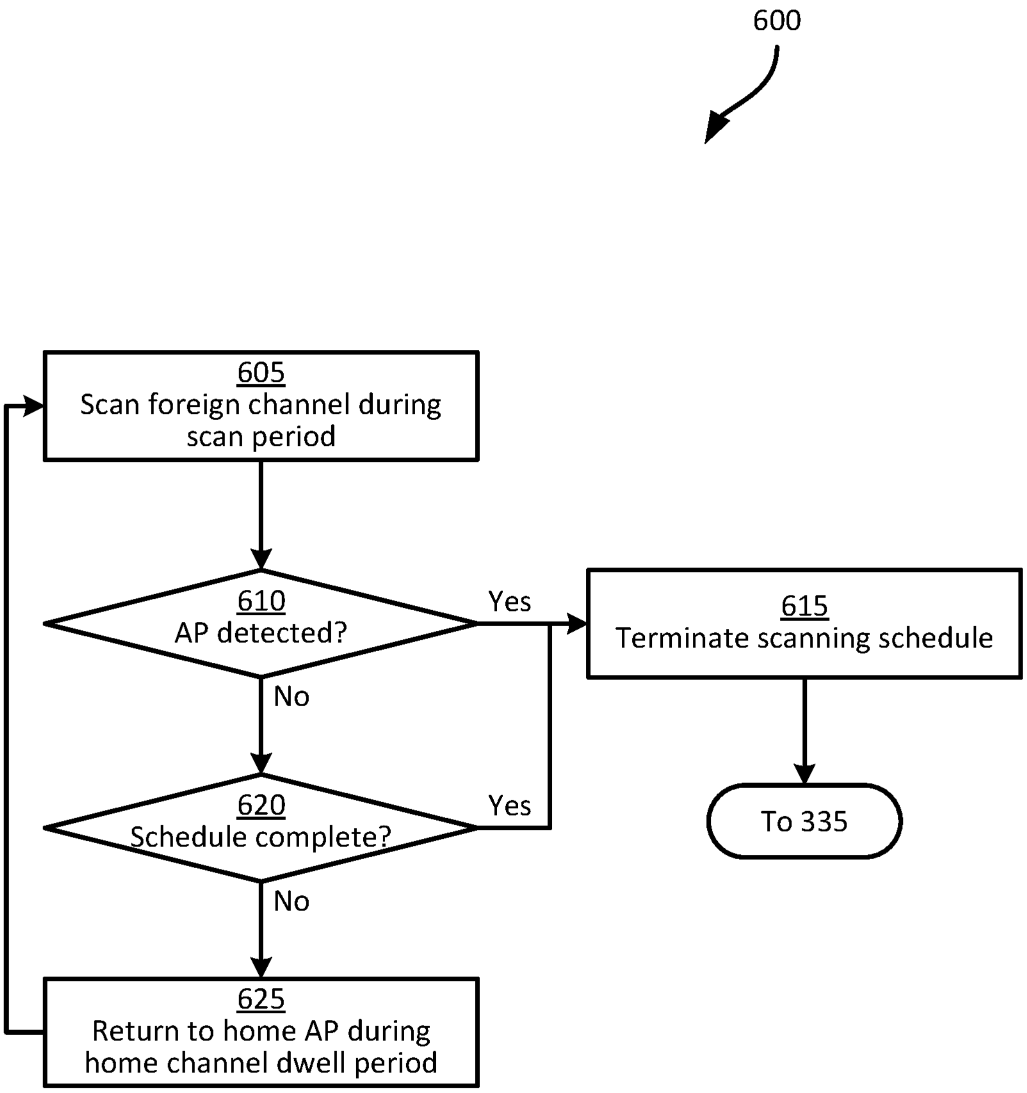
FIG. 6 is a flowchart of an example method of executing a scanning schedule at block 330 of the method of FIG. 3.

In the example timeline 500, since the beacon signal 504 is received by the device 104 during the first scan period 414-1, the scanning schedule 410 may be terminated after completion of the first scan period 414-1. Accordingly, in some examples, the device 104 may be configured to periodically check if the foreign access point 124 of the foreign channel has been detected. For example, FIG. 6 depicts a flowchart of an example method 600 of executing the scanning schedule.

At block 605, the device 104 performs a scan of the foreign channel during a scan period of the scanning schedule. The scan may include a passive scan of a DFS channel, an active scan to query for a foreign access point 124, or another suitable scan according to the type of the foreign channel.

At block 610, the device 104 determines whether the foreign access point 124 corresponding to the foreign channel has been detected. For example, if the foreign channel is a DFS channel, the device 104 may make the determination based on whether a beacon signal was received during the scan period at block 605. Alternately, the device 104 may make the determination based on whether a response has been received to a query sent at block 605. The device 104 may make the determination at block 610 after completion of block 605, or at periodic intervals during execution of block 605.

If the determination at block 610 is affirmative, that is, the device 104 determines that the foreign access point 124 corresponding to the foreign channel has been detected, then the device 104 proceeds to block 615. At block 615, the device 104 terminates the scanning schedule. The device 104 may then proceed to block 335 of the method 300 to return to the home access point 120 for a default home channel dwell time with an identification of the foreign access point 124.

If the determination at block 610 is negative, that is, the device 104 determines that the foreign access point 124 has not been detected, then the device 104 proceeds to block 620. At block 620, the device 104 determines whether the scanning schedule is complete.

If the determination at block 620 is negative, that is, the scanning schedule is not yet complete, then the device 104 proceeds to block 625. At block 625, the device 104 proceeds to the next period of the scanning schedule, namely a home channel dwell period. Accordingly, the device 104 returns to the home channel to receive buffered data packets from the home access point 120. Upon completion of the home channel dwell period, the device 104 may return to block 605 during the next period of the scanning schedule, namely a subsequent scan period.

If the determination at block 620 is affirmative, that is, the scanning schedule is complete, then the device 104 proceeds to block 615 and terminates (or completes) the scanning schedule. The device 104 may then proceed to block 335 of the method 300 to return to the home access point 120 for a default home access point dwell time with a determination that the foreign access point 124 was not detected.

Thus, in accordance with the method 600, during the timeline 500, the device 104 may determine after the first scan period 414-1 at block 610 that the foreign access point 124 has been detected, and hence may terminate the scanning schedule 410 prior to executing the home channel dwell period 418 or the second scan period 414-2. Rather, the device 104 may return to the home access point 120 for a default home channel dwell time configured for the termination of a scan.

During the timeline 510, the device 104 may determine after the first scan period 414-1 at block 610 that the foreign access point 124 has not been detected. Accordingly, the device 104 may return to the home channel to receive buffered data packets from the home access point 120 during the home channel dwell period 418 at block 625, and may execute the second scan during the second scan period 414-2 at a subsequent iteration of block 605. After the second scan period 414-2, the device 104 may determine that the foreign access point 124 has been detected at the subsequent iteration of block 610 and may return to the home access point 120 for a default home channel dwell time configured for the termination of a scan. Alternately, the device 104 may determine that the scanning schedule 410 is complete at block 620 and may return to the home access point 120 for a default home channel dwell time configured for the termination of a scan, irrespective of the results of the scan. Specifically, the device 104 may identify that no foreign access point 124 was identified during the scan.

Returning again to FIG. 3, at block 335, after completion of the channel scan according to the scanning schedule at block 330, the device 104 may be configured to return to the home channel for a default home channel dwell time. During the default home channel dwell time, the device 104 may similarly receive data packets buffered at the home access point 120 during the preceding scan period.

At block 335, the device may additionally output and process the results of the channel scan. For example, the results of the scan may be an identification of the foreign access point 124 corresponding to the foreign channel scanned during the method 300. Alternately, the results of the scan may be an indication that no foreign access point 124 was identified for the foreign channel. In some examples, the identification of the foreign access point 124 via detection of a beacon signal during a passive scan may allow the device 104 to proceed to an active scan on the foreign channel.

Further, in some examples, the channel scan on the foreign channel may comprise a part of a broader roam scan across multiple channels, and hence the device 104 may continue the roam scan, for example by executing additional channel scans for other foreign channels. The additional channel scans may be executed, for example, via performance of the method 300. Upon completion of the roam scan, the device 104 may select an identified foreign access point 124 (e.g., based on signal strength, quality of signal, etc.) and roam to the selected foreign access point 124.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A mobile computing device comprising:

a wireless communications interface configured to connect to a network deployed by a plurality of base stations;

a controller for the wireless communications interface, the controller configured to:

detect a scan condition to scan a foreign channel while connected to a home base station on a home channel;

implement a scanning sequence including: (a) a plurality of scan periods, each of the plurality of scan periods configured to span a respective portion of a plurality of portions of a predefined scan interval for scanning the foreign channel, the plurality of scan periods in aggregate span the predefined scan interval, the scanning sequence is configured to span multiple iterations of the predefined scan interval such that a first scan period of the plurality of scan periods spans a first portion of the plurality of portions during a first iteration of the predefined scan interval and a second scan period of the plurality of scan periods spans a second portion of the plurality of portions during a second iteration of the predefined scan interval and (b) an intermediate home channel dwell period scheduled between each consecutive pair of the plurality of scan periods; and during each intermediate home channel dwell period, return to the home channel to receive data packets buffered at the home base station during a preceding scan period of the plurality of scan periods.

2. The mobile computing device of claim 1, wherein the scan condition comprises detecting that the device is configured to perform a passive scan for the foreign channel.

3. The mobile computing device of claim 2, wherein the predefined scan interval is a beacon interval at which a beacon signal is emitted on the foreign channel.

4. The mobile computing device of claim 1, wherein the controller is configured to return to the home channel for a home channel dwell time to receive data packets buffered at the home base station after completion of the scanning schedule.

5. The mobile computing device of claim 1, wherein the controller is configured to, after each scan period:

determine whether a foreign access point corresponding to the foreign channel is identified; and when the foreign access point is identified, terminate the scanning schedule.

6. A method comprising:

detecting a scan condition to scan a foreign channel while connected to a home base station on a home channel;

implementing a scanning sequence including: (a) a plurality of scan periods, each of the plurality of scan periods configured to span a respective portion of a plurality of portions of a predefined scan interval for scanning the foreign channel, the plurality of scan periods in aggregate span the predefined scan interval, the scanning sequence is configured to span multiple iterations of the predefined scan interval such that a first scan period of the plurality of scan periods spans a first portion of the plurality of portions during a first iteration of the predefined scan interval and a second scan period of the plurality of scan periods spans a second portion of the plurality of portions during a second iteration of the predefined scan interval and (b) an intermediate home channel dwell period scheduled between each consecutive pair of the plurality of scan periods; and during each intermediate home channel dwell period, returning to the home channel to receive data packets buffered at the home base station during a preceding scan period of the plurality of scan periods.

7. The method of claim 6, wherein detecting the scan condition comprises detecting that a passive scan is to be performed on the foreign channel.

8. The method of claim 7, wherein the predefined scan interval is a beacon interval at which a beacon signal is emitted on the foreign channel.

9. The method of claim 6, further comprising returning to the home channel for a home channel dwell time to receive data packets buffered at the home base station after completion of the scanning schedule.

10. The method of claim 6, further comprising, after each scan period:

determining whether a foreign access point corresponding to the foreign channel is identified; and when the foreign access point is identified, terminating the scanning schedule.

11. A non-transitory machine-readable medium storing instructions which when executed, configure a controller of device to:

detect a scan condition to scan a foreign channel while connected to a home base station on a home channel;

implement a scanning sequence including: (a) a plurality of scan periods, each of the plurality of scan periods configured to span a respective portion of a plurality of portions of a predefined scan interval for scanning the foreign channel, the plurality of scan periods in aggregate span the predefined scan interval, the scanning sequence is configured to span multiple iterations of the predefined scan interval such that a first scan period of the plurality of scan periods spans a first portion of the plurality of portions during a first iteration of the predefined scan interval and a second scan period of the plurality of scan periods spans a second portion of the plurality of portions during a second iteration of the predefined scan interval and (b) an intermediate home channel dwell period scheduled between each consecutive pair of the plurality of scan periods; and during each intermediate home channel dwell period, return to the home channel to receive data packets buffered at the home base station during a preceding scan period of the plurality of scan periods.

12. The non-transitory machine-readable medium of claim 11, wherein the scan condition comprises detecting that the device is configured to perform a passive scan for the foreign channel.

13. The non-transitory machine-readable medium of claim 12, wherein the predefined scan interval is a beacon interval at which a beacon signal is emitted on the foreign channel.

14. The non-transitory machine-readable medium of claim 11, wherein the instructions further configure the controller to return to the home channel for a home channel dwell time to receive data packets buffered at the home base station after completion of the scanning schedule.

15. The non-transitory machine-readable medium of claim 11, wherein instructions further configure the controller to, after each scan period:

determine whether a foreign access point corresponding to the foreign channel is identified; and when the foreign access point is identified, terminate the scanning schedule.

* * * * *